United States Patent Office

Re. 23,947
Reissued Feb. 15, 1955

23,947

PROCESS OF AND COMPOSITIONS FOR COMBATING TUBERCULOSIS

Herman Herbert Fox, Passaic, N. J., assignor to Hoffmann-La Roche Inc., Nutley, N. J., a corporation of New Jersey No Drawing. Original No. 2,596,069, dated May 6, 1952, Serial No. 275,249, March 7, 1952. Application for reissue December 8, 1953, Serial No. 397,061

17 Claims. (Cl. 167—65)

Matter enclosed in heavy brackets [ ] appears in the original patent but forms no part of this reissue specification; matter printed in italics indicates the additions made by reissue.

My invention relates to compositions useful to combat tuberculosis. More particularly, my invention relates to such compositions in which the active ingredient is isonicotinic acid hydrazide or an acid addition salt thereof, such as the hydrochloride. This application is a continuation-in-part of my co-pending application Serial No. 216,255, filed March 17, 1951.

It is known that tuberculosis is a contagious disease which usually runs a protracted course, often lasting for years before death or recovery. Relapses are common. It is one of the most important causes of prolonged disability and chronic ill health. It is caused by the tubercle bacillus (Mycobacterium tuberculosis). Human tuberculosis is usually caused either by the human strain or the bovine (cattle) strain of the bacillus. The bacillus is comparatively resistant. That is why dried sputum particles retain their infectiousness for prolonged periods, thus facilitating the spread of the disease. Tuberculosis is usually acquired either by the inhalation of droplets of infected sputum, either fresh or dried, or by consumption of milk from tuberculous cows.

Until the discovery of streptomycin, it was impossible to attack the tubercle bacillus directly. Treatment was based on rest, nutrition, fresh air, good nursing, and collapse therapy; in other words, on the recuperative powers of the body. The discovery of streptomycin ushered in a new era in the treatment of tuberculosis. Many compounds had previously been recommended, but they were shown not to affect human tuberculosis. Streptomycin was the first drug that could inhibit the bacillus in both animal and human bodies. It is believed that streptomycin acts by inhibiting multiplication of the bacillus. In this way it helps the recuperative powers of the body to dispose of the disease. Streptomycin, however, has a number of significant shortcomings: (1) it is not always well tolerated; (2) it may cause temporary or permanent deafness; (3) it causes dizziness and vertigo; (4) it has to be given by injection; and (5) the bacillus may learn to live with the drug, i. e., it may become resistant to its effect so that it loses its therapeutic value. Patients in which the therapeutic value of streptomycin is lost may still continue to raise sputum containing the bacilli and these bacilli which are resistant to streptomycin may affect other individuals with the disease. The patients so infected will not respond because these germs are resistant to the drug.

Para-amino-salicylic acid has been tried and has been found to be a weak anti-tubercular agent. However, when used with streptomycin it reinforces the action of streptomycin and delays the appearance of resistant strains of the bacillus. Para-amino-salicylic acid may cause severe and prolonged diarrhea. Patients may become resistant to the combination. Moreover, there have been serious side reactions.

Nicotinamide and derivatives thereof have also been tried. The amide has been reported to function only as a vitamin, and its derivatives were found to have less activity than the amide. Moreover, high toxicity was observed. (J. Org. Chem., 13, 1948, Kushner et al., pp. 834–836; J. Lab. & Clin. Med., 33, 1948, McKenzie et al., pp. 1249–1253; Mfg. Chemist, 20, 1949, p. 185.)

Among the objects of the present invention is the production of compositions for combatting tuberculosis in humans, poultry, cattle (e. g., cows), monkeys, and the like. My new compositions are useful for veterinary purposes. Effectiveness has been found for a variety of animals, including poultry, cows, rabbits, cats, dogs, mice, rats, guinea pigs, and the like. Significant results in the treatment of human beings have been noted, as will be brought out hereinafter.

One object of my invention is to provide isonicotinic acid hydrazide compositions for use in combating tuberculosis. According to my invention, this hydrazide may be associated with a carrier which may be either a solid material or a sterile parenteral liquid. The compositions may take the form of tablets, powders, capsules, or other dosage forms which are particularly useful for oral ingestion. Liquid diluents are employed in sterile condition for parenteral use, that is, by injection. Such a medium may be a sterile solvent such as water. The compositions may take the form of active material, namely, hydrazide material, admixed with solid diluents and/or tableting adjuvants such as cornstarch, lactose, talc, stearic acid, magnesium stearate, gums, or the like. Any of the tableting materials used in pharmaceutical practice may be employed where there is no incompatibility with the isonicotinic acid hydrazide material. The material may be tableted with or without adjuvants. Alternatively the hydrazide material with its adjuvant material may be placed in the usual capsule or resorbable material such as the usual gelatin capsule and administered in that form. In yet another embodiment, the hydrazide composition may be put up into powder packets and employed. Or the hydrazide composition may be prepared in the form of a suspension in a material in which the hydrazide is not soluble.

My invention embraces the use of isonicotinic acid hydrazide in various forms, e. g., as such, or in the form of acid addition salts of which the hydrochloride is illustrative. The term "hydrazide," as used herein, will mean isonicotinic acid hydrazide in that form or in the form of an acid addition salt, such as, for example, the monohydrochloride, dihydrochloride, monohydriodide, or phosphate.

It has been found that the aforesaid hydrazide has unexpected and unobvious properties of great value in combatting tuberculosis. The hydrazide is a known compound and may be prepared by known methods. Meyer and Mally, Monatsh., 33, 1912, page 400. Insofar as is known, however, its physiological properties have not heretofore been investigated; nor has the compound been applied for therapeutic purposes.

The hydrazide compound has been found to be highly active against tuberculosis, in vivo as well as in vitro. In tuberculous infection of mice, it exerts an antituberculous activity both against hematogenous infection, that is, infection produced through the intravenous route, as well as against the generally therapeutically more resistant bronchogenic infection, that is, infection produced through the intranasal route with M. tuberculosis. Thus, it has been found that by feeding mice, hematogenously infected with M. tuberculosis, a diet containing as little as 1 gram of isonicotinic acid hydrazine per 60 kilograms of diet, or 0.0017 per cent, development of tuberculosis lesions in the animals is prevented. In the case of mice infected with M. tuberculosis by bronchogenic dissemination, as little as 0.0025 per cent of isonicotinic acid hydrazide has been observed to prevent spreading of tuberculosis. Not only is the compound effective on administration by the oral route, but it is also effective when administered parenterally, e. g., subcutaneously or intraperitoneally. The tolerated dose orally in mice is 125 mg. per kg. of body weight in a single dose and subcutaneously 200 mg. per kg. in a single dose. In in vitro tests, it inhibited the growth of tubercle bacilli in concentrations of less than one part per million.

The antituberculous efficacy of isonicotinic hydrazide upon animals is shown in the following examples. The experiments described therein were carred out on white mice weighing from 18–20 grams. A single strain of mice bred under uniform conditions of nutrition and environment was used in all the experiments.

EXAMPLE 1

One gram of isonicotinic acid hydrazide was ground to a fine powder and was then mixed with 25 grams of a commercially available mouse diet known as the Rockland Mouse Diet, which is sold by Arcady Farms Milling Company, Chicago, Illinois. The resulting mixture was then slowly added to 974 grams of ground Rockland Mouse Diet and thoroughly mixed so that a final concentration of 1:1000 of isonicotinic acid hydrazide to the diet was obtained. In an identical manner a diet containing a concentration of 1:1000 of isonicotinic acid hydrazide to a commercial diet known as Borden's Dog Food was prepared.

The antituberculous activity of each of the diets medicated with isonicotinic acid hydrazide as described above was determined in the following manner: Groups of 20 mice each were infected intravenously with 0.5 cc. of a $10^{-1}$ dilution of a human strain of tuberculosis known as M. tuberculosis H37Rv in Dubos' medium while other groups of 20 mice each were infected intranasally with 4 drops of a $10^{-1}$ dilution of M. tuberculosis H37Rv in Dubos' medium. The Dubos' medium employed is that described by Dubos, R. J. and G. Middlebrook: Media for Tubercle Bacilli, Am. Rev. Tub. 56: 334 (1947) containing the Tween 80 but modified by the omission of the albumin. Ten animals from each of the groups were allowed to feed ab libitum on the medicated diets for 21 days. Ten animals from each group were placed on the plain unmedicated Rockland Mouse Diet and on the Borden's Dog Food respectively, as controls. The treated animals consumed in this manner approximately 250 milligrams of isonicotinic acid hydrazide per kilogram of body weight per day when given the 1:1000 diet. This figure is based on the observation that mice normally consume 5.0 grams of food per day, so that a 1:1000 diet corresponds to a drug consumption of 250 mg./kg./day. The expression "mg./kg./day" means milligrams per kilogram of body weight per day.

All of the animals were sacrificed and autopsied on the 22nd day. All of the animals which were fed on the diets containing isonicotinic acid hydrazide showed no gross tuberculous lesions in the lungs. On the other hand, all control animals fed on the non-medicated diets showed wide-spread gross tuberculous lesions.

In other experiments, carried out in the same manner, but with different concentrations of isonicotinic acid hydrazide in the diet mixtures, the lower limit of activity of the mixtures, that is, the smallest dose of isonicotinic acid hydrazide giving 80–100 per cent protection of the animals, was found to be 4.1 mg./kg./day or 1 gram of isonicotinic acid hydrazide in 60,000 grams of diet in case of intravenous infection; and 6.3 mg./kg./day or 1 gram of isonicotinic acid hydrazide in 40,000 grams of diet in case of the intranasal infection.

EXAMPLE 2

250 mg. of isonicotinic acid hydrazide were dissolved in 250 cc. of sterile distilled water, and another 250 mg. of isonicotinic acid hydrazide were dissolved in 250 cc. of 0.85 per cent sterile saline solution, to give solutions of 1:1000. To test each solution of the isonicotinic acid hydrazide, groups of 20 mice each were infected intravenously with M. tuberculosis H37Rv while other groups of 20 mice each were infected intranasally as described in Example 1. Shortly after infection, 10 mice from each group were subcutaneously injected with the isonicotinic acid hydrazide solutions, the other 10 mice serving as controls. The dose was given according to the weight of the mice, calculated on the basis of 1 cc. per 20 grams body weight, so that each animal received 50 mg./kg./day of isonicotinic acid hydrazide. A total of 21 daily subcutaneous injections were given to the animals.

The animals were sacrificed and autopsied on the 22nd day. All treated animals showed no gross tuberculous lesions in the lungs. All control animals, on the other hand, showed widespread gross tuberculous lesions.

In other experiments carried out in the same manner, but with different concentrations of isonicotinic acid hydrazide, the lower limit of activity of the solutions, that is, the smallest dose of isonicotinic acid hydrazide giving 100 per cent protection of the animals, was found to be both for the intravenous and intranasal infection, 5.0 mg./kg./day or one gram of isonicotinic acid hydrazide in 10,000 cc. of sterile distilled water or 0.85 per cent saline solution.

EXAMPLE 3

Experiments were carried out in the same way as in Example 2, using 1:1000 solutions except that the solutions of isonicotinic acid hydrazide were administered intra-abdominally. The dose was given according to the weight of the mice calculated on the basis of 1.0 cc. per 20 grams body weight so that each animal received 50 mg./kg./day of isonicotinic acid hydrazide. A total of 21 daily intra-abdominal injections were given to all treated animals.

The animals were sacrificed and autopsied on the 22nd day. All treated animals showed no gross tuberculous lesions in the lungs. All control animals on the other hand, showed widespread tuberculous lesions. In other experiments carried out in the same manner, but employing solutions of different concentrations of isonicotinic acid hydrazide, the lower limit of activity of the solutions, that is, the smallest dose of isonicotinic acid hydrazide giving 100 per cent protection of the animals, was found to be 1.25 mg./kg./day; that is, 1 gram of isonicotinic acid hydrazide in 40,000 cc. of sterile distilled water, or 0.85 per cent sterile saline solution, for the intravenous infection; and 2.5 mg./kg./day, that is, 1 gram of isonicotinic acid hydrazide in 20,000 cc. of sterile distilled water, or sterile 0.85 per cent saline for the intranasal infection.

EXAMPLE 4

250 mg. of isonicotinic acid hydrazide were dissolved in 250 cc. of sterile distilled water to give a solution of 1:1000. Groups of 20 mice each were infected intravenously and other groups of 20 mice were infected intranasally in the same manner as described in Example 1. Shortly after the infection, the solution was administered per os to 10 mice from each group by stomach tube, the other 10 mice serving as controls. The dose was administered according to the weight of the mice calculated on the basis of 1 cc. per 20 grams body weight, so that each animal received 50 mg./kg./day of isonicotinic acid hydrazide. A total of 21 daily per os treatments were administered to the animals by stomach tube. The animals were sacrificed and autopsied on the 22nd day. All treated animals showed no gross tuberculous lesions in the lungs. All control animals, on the other hand, showed wide-spread tuberculous gross lesions.

In other experiments carried out in the same manner, but employing solutions of different concentrations of isonicotinic acid hydrazide, the lower limit of activity of the solutions, that is, the smallest dose of isonicotinic acid hydrazide giving 80–100 per cent protection of the animals, was found to be 6.3 mg./kg./day; that is, 1 gram of isonicotinic acid hydrazide in about 8,000 cc. of sterile distilled water for the intravenous infection, and 2.5 mg./kg./day, that is, 1 gram in 20,000 cc. of sterile distilled water for the intranasal infection.

The efficacy of isonicotinic acid hydrazide in vitro is shown in the following example.

EXAMPLE 5

9 cc. of Dubos' medium were placed into the first test tube in each of a series of eleven test tubes. Into the remaining test tubes were pipetted 5 cc. of the same medium. One cc. of a 1:200 solution in distilled water of isonicotinic acid hydrazide was placed into the first tube in each series and mixed thoroughly with the 9 cc. of the Dubos' medium thus giving a final concentration of 12000 isonitocinic acid hydrazide. Serial dilutions were then made through the next 9 tubes in each series by transferring 5 cc. from the first tube to the second, etc. The 10th tube in each series thus contained a concentration of 1:1,024,000 of isonicotinic acid hydrazide. The 11th tube in each series served as a control. Each test tube was then inoculated with one drop of a 7–10 day old culture of M. tuberculosis H37Rv and incubated at 37° C. Readings were taken at 7, 14 and 21-day intervals. No growth of M. tuberculosis occurred in any of the tubes containing isonicotinic acid hydrazide. The controls, however, developed normal growth of the organism.

Additional investigations have been carried out which confirm and establish the results shown in Example 5 with respect to the activity of isonicotinic acid hydrazide as well as acid addition salts thereof. The in vitro tests supplement the tests used with various animals, rodents and tests on human beings. All of these various investigations have cumulative significance wtih respect to my invention.

Treatments of monkeys has also been carried out. Note the report of Irving Zieper and Roger Lewis, Tuberculosis in a Macacus Rhesus Treated with Isonicotinylhydrazine, The Quarterly Bulletin of Sea View Hospital, vol. XIII, No. 1, January 1952, pages 12 to 16. Therein the conclusion appears that isonicotinylhydrazine was effective for combatting clinical tuberculosis of monkeys.

Of prime interest is the value of the hydrazide compositions for combating tuberculosis in humans. Reports by Irving Selikoff, Edward Robitzek and George Ornstein, The Quarterly Bulletin, supra, pages 17 and 27, present data and conclusions as to chemotherapy and toxicity. The authors state that the absence of serious toxic effects on liver, kidney and bone marrow is in agreement with primate experiments conducted by Lewis and Zieper.

Robitzek, Selikoff and Ornstein, Quarterly Bulletin, supra, pages 27–51, report on the chemotherapy of the hydrazide compositions and direct attention to the striking and clinical effectiveness of the hydrazide compositions in human tuberculosis. Of particular significance is the selectivity of test patients to insure reliable and total evaluation. The authors characterize the patients as "hopeless." The authors report that they found a profound and important therapeutic effect in human tuberculosis in these "mortally ill patients." The authors report (page 51) the rapid halting of the systemic ravages of the tuberculosis process, with loss of toxicity, return of temperature to normal, recovery of appetite, remarkable weight gain, all with a rapidity and certainty to a degree never observed by them in other chemotherapeutic or antibiotic agents. They also note important chemotherapeutic effects on extra-pulmonary tuberculosis, including meningeal and oro-pharnygeal and laryngeal types, to a degree superior to experiences with known antibiotic or chemotherapeutic agents.

As noted above, my compositions for combating tuberculosis may take any of a variety of forms. Various diluents may be employed. Of particular interest is the use of animal feed compositions, such as the mouse feed and dog feed compositions containing the active ingredient, as outlined above. Other animal feeds may be used consistent with the particular animals to whom the compositions are administered.

The percentage of active ingredient in my compositions may be varied. It is necessary that the active ingredient constitute a proportion such that a suitable dosage will be obtained. Obviously several unit dosage forms may be administered at about the same time. Although I have found that a percentage of less than 0.10 per cent of active ingredient is effective, I prefer to use not less than 0.10 per cent of active agent. Activity increases with concentration of the agent. I have found that the percentage of active agent may be 10 per cent, or 25 per cent, or even a higher proportion. For example, tablets may be prepared with a minor proportion of diluent and a major proportion of active material. Tablets containing from about 10 to about 50 mg. of active ingredient are particularly useful. The following formulations, as well as those already given above, are intended to be illustrative only and they may be varied or modified to a considerable extent without departing from the spirit of the invention. I do not therefore intend to limit my invention to the specific embodiments herein set forth.

EXAMPLE 6

| | | |
|---|---|---|
| Isonicotinic acid hydrazide | mg | 25 |
| Placebo granules | mg | 167.5 |
| Talc | mg | 4.5 |
| Stearic acid | mg | 3 |

The placebo granules contained:

| | | |
|---|---|---|
| Lactose | per cent | 65 |
| Cornstarch | do | 35 |

EXAMPLE 7

| | Mg. |
|---|---|
| 1. Isonicotinic acid hydrazide | 10 |
| 2. Cornstarch | 15 |
| 3. Lactose | 33 |
| 4. Cornstarch (as 10% paste) | 2.5 |
| 5. Stearic acid | 1.0 |
| 6. Dried cornstarch | 3.5 |
| 7. Sugar coating, approximately | 50 |

The powders 1, 2, and 3 are mixed, then granulated with 4. Add 5 and 6 and tablet. Coat with sugar coating.

EXAMPLE 8

| | Mg. |
|---|---|
| 1. Isonicotinic acid hydrazide | 10 |
| 2. Cornstarch | 57 |
| 3. Lactose | 73 |
| 4. Talc | 9 |
| 5. Stearic acid | 6 |

Powders 1, 2, and 3 were slugged, then granulated, mixed with 4 and 5, and tableted.

EXAMPLE 9

| | | |
|---|---|---|
| Isonicotinic acid hydrazide | mg | 25 |
| Placebo granules | mg | 160 |
| Talc | mg | 9 |
| Stearic acid | mg | 5 |
| Magnesium stearate | mg | 1 |

The placebo granules contained:

| | | |
|---|---|---|
| Lactose | per cent | 55 |
| Cornstarch | do | 45 |

EXAMPLE 10

| | | Mg. |
|---|---|---|
| Isonicotinic acid hydrazide | | 50 |
| Placebo granules: | | |
| Lactose | 103.6 | |
| Cornstarch | 81.4 | |
| | | 185 |
| Talc | | 4 |
| Stearic acid | | 4 |
| Magnesium stearate | | 2 |

Procedure.—A placebo granule is made of 55% lactose and 45% cornstarch. Isonicotinic acid hydrazide, screened through #20 mesh, is added, and the lubricants, talc, stearic acid, and magnesium stearate, are added. Tableting is done on a rotary machine.

EXAMPLE 11

An illustrative example of preparing a large lot of ampul solution is as follows:

Eight liters of distilled water for injection, U. S. P., are placed in a 20-liter Pyrex glass bottle. To this water 500 grams of isonicotinic acid hydrazide are added with stirring until solution is effected. The pH is adjusted thereafter with sufficient reagent grade N/10 hydrochloric acid to achieve a pH of about 6.0. Then sufficient water for injection is added to bring the volume to 10 liters. The solution is filtered and filled into clean, dry, sterile, flint glass ampuls, each containing 2.2 cc. of the fluid. The ampuls are sealed and sterilized for 30 minutes at 115° F.

I claim:

1. A composition for combatting tuberculosis comprising not less than 0.10 per cent of a member selected from the group consisting of isonicotinic acid hydrazide and acid addition salts thereof and a sterile parenteral water diluent at a pH of about 6.0.

2. A composition for combatting tuberculosis comprising not less than 0.10 per cent of a member selected from the group consisting of isonicotinic acid hydrazide and acid addition salts thereof and a sterile parenteral water diluent adjusted to a pH of about 6.0 with hydrochloric acid.

3. A veterinary feed for combatting tuberculosis comprising not less than 0.10 per cent of a member selected from the group consisting of isonicotinic acid hydrazide and acid addition salts thereof.

4. A composition in dosage unit form for combatting tuberculosis comprising not less than 10 mg. of a member selected from the group consisting of isonicotinic acid hydrazide and acid addition salts thereof per dosage unit and a solid pharmaceutical carrier.

5. A composition in dosage unit form for combatting tuberculosis comprising about 10 to about 50 mg. of isonicotinic acid hydrazide per dosage unit and a solid pharmaceutical carrier.

6. A composition in dosage tablet unit form for combatting tuberculosis comprising about 10 to about 50 mg. of isonicotinic acid hydrazide per dosage unit and a solid pharmaceutical carrier.

7. A composition in dosage unit form for combatting tuberculosis comprising not less than about 10 mg. of a member selected from the group consisting of isonicotinic acid hydrazide and acid addition salts thereof and a solid pharmaceutical carrier, said composition being in tablet dosage unit form.

8. A composition according to claim 7 in which the diluent comprises at least one member selected from the group consisting of lactose, cornstarch, and stearic acid.

9. A composition for combatting tuberculosis comprising from about 0.1 per cent to about 50 per cent of a member selected from the group consisting of isonicotinic acid hydrazide and acid addition salts thereof and a significant amount of a pharmaceutical carrier.

10. A composition for combatting tuberculosis comprising from about 0.1 per cent to about 50 per cent of isonicotinic acid hydrazide and significant amount of a pharmaceutical carrier.

11. A composition for combatting tuberculosis comprising from about 0.1 per cent to about 50 per cent of a member selected from the group consisting of isonicotinic acid hydrazide and acid addition salts thereof and a significant amount of a solid phamaceutical carrier.

12. A composition for combatting tuberculosis comprising from about 0.1 per cent to about 50 per cent of isonicotinic acid hydrazide and a significant amount of a solid pharmaceutical carrier.

13. A composition in dosage unit form for combatting tuberculosis comprising from about 1 mg. to about 50 mg. of a member selected from the group consisting of isonicotinic acid hydrazide and acid addition salts thereof and a significant amount of a pharmaceutical carrier.

14. A composition for combatting tuberculosis comprising not less than 0.1 per cent of a member selected from the group consisting of isonicotinic acid hydrazide and acid addition salts thereof and a carbohydrate containing pharmaceutical carrier.

15. A composition in dosage unit form for combatting tuberculosis comprising not less than 10 milligrams of isonicotinic acid hydrazide per dosage unit and a solid pharmaceutical carrier.

*16. A method of combating tubercle bacilli which comprises subjecting said organisms to a composition comprising not less than 0.10 per cent of a member selected from the group consisting of isonicotinic acid hydrazide and acid addition salts thereof.*

*17. A method of combating tuberculosis which comprises administering a composition comprising not less than 0.1 per cent of isonicotinic acid hydrazide to a human host infected with tubercle bacilli.*

References Cited in the file of this patent or the original patent

Chemical Abstracts, vol. 6, pp. 2073 to 2074.

Manufacturing Chemist and Manufacturing Perfumer, April 1949, vol. 20, No. 4, p. 185.

Beilstein, Vierte Auflage, Band XXII, p. 504, J. Springer, Berlin, 1935.

Jouin et al.: Ann. de l'Institut Pasteur, vol. 22 (1946), pp. 580, 589, 590.